(12) United States Patent
Takami (10) Patent No.: US 11,010,864 B2
(45) Date of Patent: May 18, 2021

(54) IMAGE CAPTURING APPARATUS, CONTROL METHOD, AND STORAGE MEDIUM

(71) Applicant: CANON KABUSHIKI KAISHA, Tokyo (JP)

(72) Inventor: Shinjiro Takami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/775,009

(22) Filed: Jan. 28, 2020

(65) Prior Publication Data

US 2020/0167892 A1 May 28, 2020

Related U.S. Application Data

(63) Continuation of application No. PCT/JP2018/027463, filed on Jul. 23, 2018.

(30) Foreign Application Priority Data

Aug. 1, 2017 (JP) .............................. JP2017-149095

(51) Int. Cl.
| | |
|---|---|
| *G06T 3/00* | (2006.01) |
| *G06T 7/80* | (2017.01) |
| *G02B 13/06* | (2006.01) |
| *H04N 7/18* | (2006.01) |
| *G06F 3/00* | (2006.01) |
| *H04N 5/232* | (2006.01) |

(52) U.S. Cl.
CPC ............ *G06T 3/0018* (2013.01); *G02B 13/06* (2013.01); *G06T 7/80* (2017.01); *H04N 7/18* (2013.01); *G06T 2207/30232* (2013.01)

(58) Field of Classification Search
CPC ...................... G06T 3/0018; G06T 7/80; G06T 2207/30232; G02B 13/06; H04N 7/18; H04N 5/23206; G08B 13/1965; G06F 3/005
See application file for complete search history.

(56) References Cited

U.S. PATENT DOCUMENTS

| | | | | | |
|---|---|---|---|---|---|
| 6,714,253 | B2* | 3/2004 | Kim | ..................... | H04N 5/4401 348/554 |
| 8,479,253 | B2* | 7/2013 | Glen | .................... | H04N 21/454 725/153 |
| 8,615,156 | B2* | 12/2013 | Glen | .................. | H04N 5/44543 386/230 |

(Continued)

FOREIGN PATENT DOCUMENTS

| | | |
|---|---|---|
| JP | 2013243544 A | 12/2013 |
| JP | 2013258538 A | 12/2013 |

(Continued)

*Primary Examiner* — Brian P Yenke
(74) *Attorney, Agent, or Firm* — Canon U.S.A., Inc. IP Division (57) ABSTRACT

An acquiring unit configured to acquire association information that indicates a relationship between a profile, which is a setting information group containing a plurality of pieces of setting information, and dewarp information on a fisheye image, and a associating unit configured to associate a video source configuration, a video encoder configuration, and a PTZ configuration to the profile based on the association information acquired by the acquiring unit are provided.

10 Claims, 11 Drawing Sheets

(56) References Cited

U.S. PATENT DOCUMENTS

| | | | | |
|---|---|---|---|---|
| 9,407,808 B2* | 8/2016 | Idaka | | H04N 5/2628 |
| 9,423,868 B2* | 8/2016 | Iwasaki | | H04N 5/23206 |
| 9,531,935 B2* | 12/2016 | Niida | | H04N 5/23206 |
| 9,538,145 B2* | 1/2017 | Iwasaki | | H04N 21/2187 |
| 9,584,714 B2* | 2/2017 | Niida | | H04N 5/2351 |
| 9,609,198 B2* | 3/2017 | Iwasaki | | H04N 9/8042 |
| 9,609,199 B2* | 3/2017 | Nakata | | H04N 5/2353 |
| 9,621,801 B2* | 4/2017 | Haga | | H04N 5/232 |
| 9,635,221 B2* | 4/2017 | Iwasaki | | H04N 5/225 |
| 9,723,195 B2* | 8/2017 | Ashitani | | H04N 5/232 |
| 9,736,351 B2* | 8/2017 | Iwasaki | | H04N 5/23216 |
| 9,769,369 B2* | 9/2017 | Suzuki | | H04N 5/2254 |
| 9,794,463 B2* | 10/2017 | Adachi | | H04N 7/183 |
| 9,826,137 B2* | 11/2017 | Yokomizo | | H04N 5/23245 |
| 9,888,049 B2* | 2/2018 | Niida | | H04N 5/772 |
| 9,936,118 B2* | 4/2018 | Niida | | H04N 5/23206 |
| 9,942,457 B2* | 4/2018 | Yokomizo | | H04N 5/907 |
| 9,955,081 B2* | 4/2018 | Niida | | H04N 5/23219 |
| 9,966,046 B2* | 5/2018 | Kawawa | | G06F 3/14 |
| 9,973,675 B2* | 5/2018 | Iwasaki | | H04N 5/232935 |
| 9,992,438 B2* | 6/2018 | Nakanishi | | H04N 5/44 |
| 10,027,874 B2* | 7/2018 | Niida | | H04N 5/23216 |
| 10,063,759 B2* | 8/2018 | Mori | | H04L 12/28 |
| 10,136,072 B2* | 11/2018 | Iwasaki | | H04N 5/2355 |
| 10,162,546 B2* | 12/2018 | Iwasaki | | H04N 5/907 |
| 10,171,747 B2* | 1/2019 | Yokomizo | | H04N 5/2353 |
| 10,192,284 B2* | 1/2019 | Lee | | H04N 7/181 |
| 10,193,871 B2* | 1/2019 | Asano | | H04L 63/0823 |
| 10,200,584 B2* | 2/2019 | Fujita | | H04N 5/2351 |
| 10,277,570 B2* | 4/2019 | Takami | | H04L 63/08 |
| 10,277,794 B2* | 4/2019 | Ikegami | | G06T 7/60 |
| 10,284,821 B2* | 5/2019 | Nakanishi | | H04N 5/23299 |
| 10,298,830 B2* | 5/2019 | Iwasaki | | H04N 5/30 |
| 10,313,576 B2* | 6/2019 | Iwasaki | | H04N 5/30 |
| 10,356,302 B2* | 7/2019 | Iwasaki | | H04N 7/183 |
| 10,448,102 B2* | 10/2019 | Martin | | H04N 21/84 |
| 10,567,639 B2* | 2/2020 | Taoki | | G06F 3/0482 |
| 2012/0179742 A1* | 7/2012 | Acharya | | G08G 1/0175 |
| | | | | 709/202 |
| 2013/0278706 A1* | 10/2013 | Connelly | | H04N 21/4415 |
| | | | | 348/14.01 |
| 2013/0329067 A1* | 12/2013 | Niida | | H04N 5/23203 |
| | | | | 348/211.99 |
| 2014/0074977 A1* | 3/2014 | Niida | | H04N 5/772 |
| | | | | 709/217 |
| 2014/0118545 A1* | 5/2014 | Iwasaki | | H04N 5/23293 |
| | | | | 348/143 |
| 2016/0112629 A1* | 4/2016 | Lee | | H04N 7/183 |
| | | | | 348/39 |
| 2016/0115644 A1* | 4/2016 | Cho | | D06F 58/26 |
| | | | | 34/212 |
| 2016/0226850 A1* | 8/2016 | Takami | | H04L 67/306 |
| 2016/0325680 A1* | 11/2016 | Curtis | | H04N 13/239 |
| 2017/0019643 A1* | 1/2017 | Nakanishi | | H04N 5/23299 |
| 2017/0070657 A1* | 3/2017 | Yokomizo | | H04N 5/772 |
| 2017/0085776 A1* | 3/2017 | Iwasaki | | G03B 17/561 |
| 2017/0104952 A1* | 4/2017 | Nakanishi | | H04N 7/183 |
| 2017/0201724 A1* | 7/2017 | Galvin | | H04N 21/6125 |
| 2018/0152715 A1* | 5/2018 | Sevin | | H04N 7/0102 |
| 2018/0191943 A1* | 7/2018 | Yokomizo | | H04N 5/772 |
| 2019/0045109 A1* | 2/2019 | Takami | | H04N 7/183 |
| 2019/0104254 A1* | 4/2019 | Cha | | H04N 5/23238 |
| 2019/0238744 A1* | 8/2019 | Takami | | H04N 5/2621 |
| 2019/0273895 A1* | 9/2019 | Nakanishi | | H04N 5/23206 |
| 2019/0289194 A1* | 9/2019 | Cha | | H04N 5/247 |
| 2019/0370992 A1* | 12/2019 | Takami | | H04N 21/44008 |
| 2019/0378289 A1* | 12/2019 | Stokking | | G02B 27/017 |
| 2020/0099896 A1* | 3/2020 | Galvin | | H04N 7/183 |
| 2020/0105917 A1* | 4/2020 | Okita | | H01L 29/2003 |
| 2020/0162458 A1* | 5/2020 | Setlur | | H04L 63/02 |
| 2020/0177803 A1* | 6/2020 | Honjo | | H04N 5/23225 |
| 2020/0221018 A1* | 7/2020 | Jung | | H04N 5/23216 |
| 2020/0322537 A1* | 10/2020 | Takami | | H04N 5/23206 |

FOREIGN PATENT DOCUMENTS

| | | |
|---|---|---|
| JP | 2014107590 A | 6/2014 |
| JP | 2015080142 A | 4/2015 |
| JP | 2015222931 A | 12/2015 |
| JP | 2017017446 A | 1/2017 |

* cited by examiner

DEPENDENCY TABLE

■ VIDEO SOURCE CONFIGURATION 1
   <VIDEO ENCODER CONFIGURATION>
      VIDEO ENCODER CONFIGURATION 1
   <PTZ CONFIGURATION>
      NONE

■ VIDEO SOURCE CONFIGURATION 2
   <VIDEO ENCODER CONFIGURATION>
      VIDEO ENCODER CONFIGURATION 2
   <PTZ CONFIGURATION>
      PTZ CONFIGURATION 1

IMAGE CAPTURING APPARATUS, CONTROL METHOD, AND STORAGE MEDIUM

CROSS-REFERENCE TO RELATED APPLICATIONS

This application is a Continuation of International Patent Application No. PCT/JP2018/027463, filed Jul. 23, 2018, which claims the benefit of Japanese Patent Application No. 2017-149095, filed Aug. 1, 2017, both of which are hereby incorporated by reference herein in their entirety.

TECHNICAL FIELD

The present invention relates to an image capturing apparatus, a control method, and a storage medium.

BACKGROUND ART

Hitherto, in a surveillance camera that sends a captured image to a client apparatus, a command group for instructing the surveillance camera to change settings from an external apparatus or to start distributing images from an external apparatus is installed. As an example of such a command group, a command group defined by the standard developed by open network video interface forum (ONVIF) is known.

In ONVIF, the following items are set as the settings (configurations) of the surveillance camera. In other words, a video source setting (video source configuration) is defined. The video source setting (video source configuration) contains dewarp information and a resolution. The dewarp information determines the presence or absence and type of image distortion correction and image clipping range. The resolution is that a sensor is able to output. A video encoder setting (video encoder configuration) is defined. The video encoder setting (video encoder configuration) contains an encode type for encoding an image, a resolution, and the like. A PTZ setting (PTZ configuration) is defined. The PTZ setting (PTZ configuration) contains, for example, whether pan, tilt, or zoom is supported or not.

Figure 1:
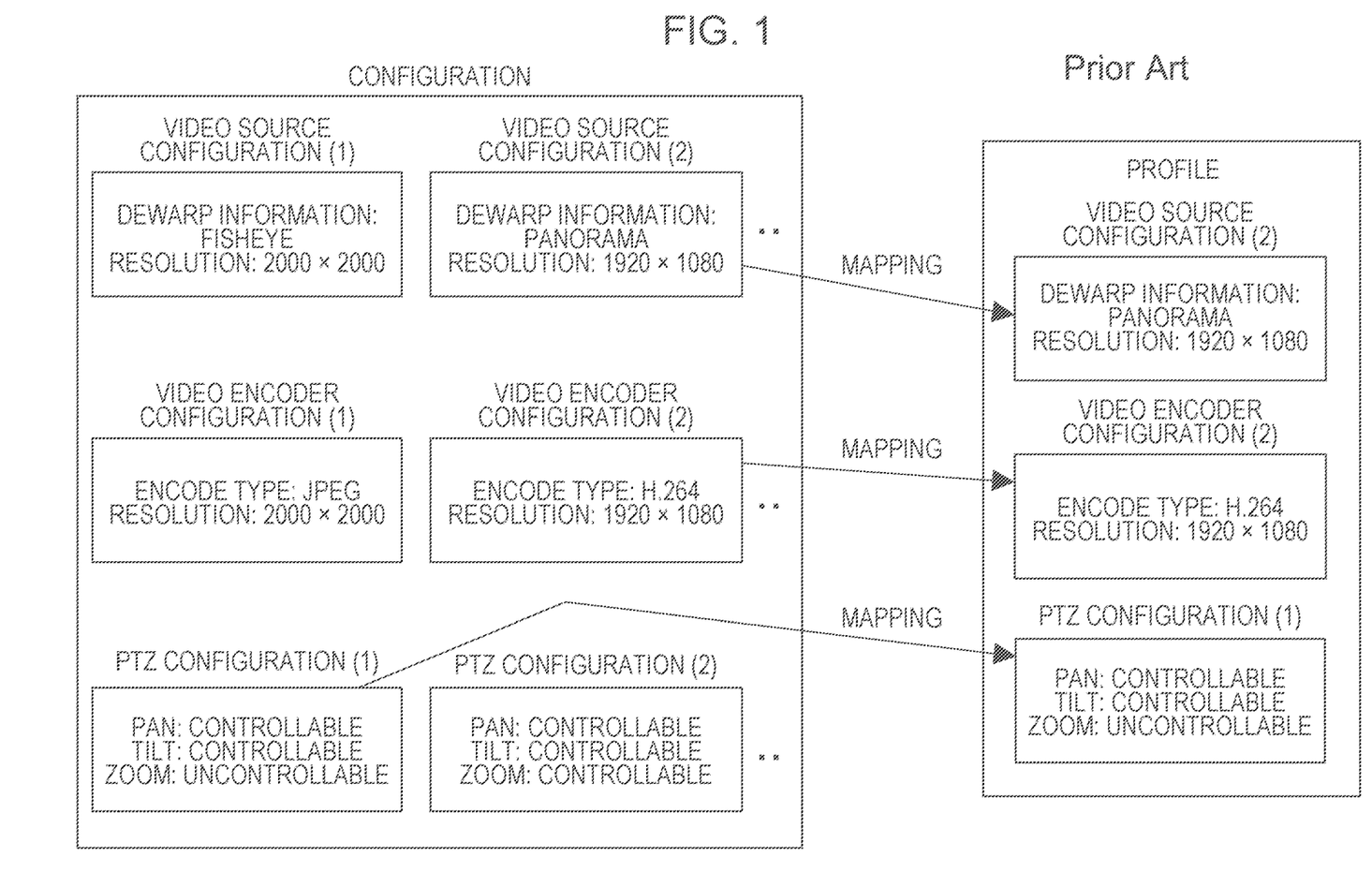
FIG. 1 is a view that illustrates an example in which configurations are mapped to a profile.

These configurations are mapped to (associated with) a profile to be designated for control over the surveillance camera, and the surveillance camera provides video distribution, PTZ control, or the like, with the details of the configurations mapped to the profile. A profile is a collection of the above-described settings and is used, for example, when a client apparatus receives a video stream from a surveillance camera. For example, a client apparatus designates the settings contained in the profile and instructs the surveillance camera to send a video stream based on the settings. FIG. 1 is a view that illustrates an example in which configurations are mapped to a profile in compliance with ONVIF. In this way, one of each is selected from among one or more video source configurations, video encoder configurations, and PTZ configurations and is mapped to a profile.

There are a method in which a surveillance camera prepares a profile to which configurations have been already mapped and a method in which a client apparatus acquires configurations from a surveillance camera and maps the configurations to a profile. When a client apparatus maps configurations to a profile, the client apparatus maps the configurations in consideration of dependency among the configurations.

For example, in the case of a camera that is an omnidirectional camera capable of generating a plurality of images, such as a fisheye image, a panoramic image, and an image partially clipped from a fisheye image, the dewarp information of an image is designated in a video source configuration.

When a fisheye image is distributed from a surveillance camera, a video source configuration compatible with the fisheye image is mapped to a profile. At this time, a video encoder configuration having a resolution that can be set for a fisheye image is set.

When PTZ of a fisheye image cannot be performed, a PTZ configuration cannot be mapped to a profile.

In this way, depending on the dewarp information of an image to be distributed, a video source configuration, a video encoder configuration, and a PTZ configuration, compatible with the dewarp information, are, for example, mapped to a profile, and a surveillance camera is not able to provide video distribution or PTZ control unless those settings are mapped properly.

Japanese Patent Laid-Open No. 2014-107590 describes an image capturing apparatus that adjusts setting values between a video source configuration and a video encoder configuration.

CITATION LIST

Patent Literature

PTL 1 Japanese Patent Laid-Open No. 2014-107590

However, the technique of Japanese Patent Laid-Open No. 2014-107590 is to adjust the dependency of setting values among the configurations of a surveillance camera.

SUMMARY OF INVENTION

To adjust the dependency of setting values among the configurations of a surveillance camera, for example, the following components are provided. An acquiring unit configured to acquire association information that indicates a relationship between a profile, which is a setting information group containing a plurality of pieces of setting information, and dewarp information on a fisheye image, and a mapping unit configured to map a video source configuration, a video encoder configuration, and a PTZ configuration to the profile based on the association information acquired by the acquiring unit are provided.

Further features of the present invention will become apparent from the following description of exemplary embodiments with reference to the attached drawings.

DESCRIPTION OF EMBODIMENTS

Hereinafter, an embodiment of the present invention will be described with reference to the attached drawings.

First Embodiment

Figure 2:
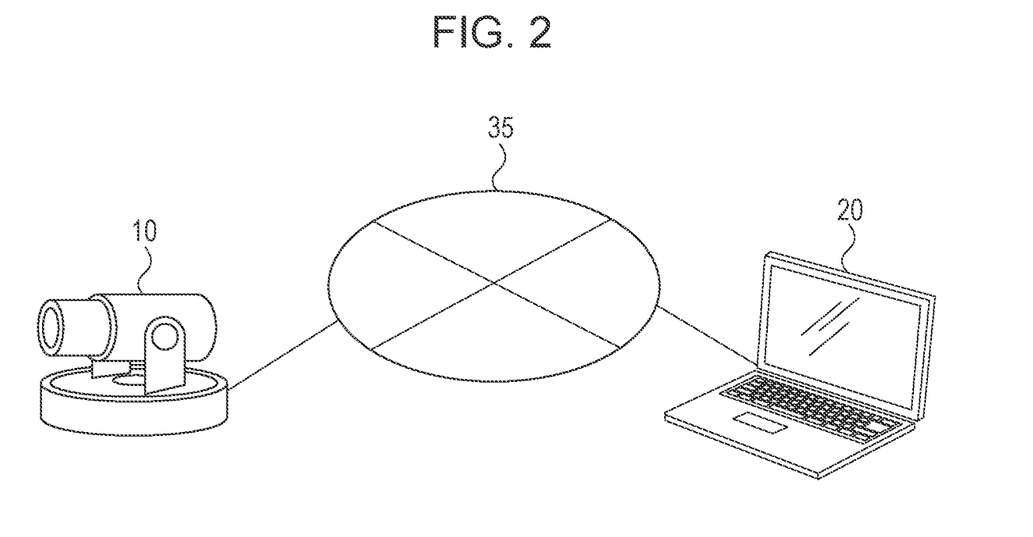
FIG. 2 is a view that illustrates an example of a system constitution including a surveillance camera.

FIG. 2 is a view that illustrates an example of a system constitution including a surveillance camera 10. The surveillance camera 10 and a client apparatus 20 are connected via a network 35 so as to be communicable with each other. The client apparatus 20 is an external apparatus that sends a control command, such as a profile association setting command and a profile acquisition command, to the surveillance camera 10. The surveillance camera 10 sends a command response to the client apparatus 20.

In the following description, dewarp information is information on dewarping. For example, a fisheye image captured via a fisheye lens mostly undergoes a process of both image clipping and image distortion correction, called dewarping. A clipped image is variously called depending on a clip position, the number of clips, and whether the clip position is changeable. For example, when a clip range is wide, a clipped image can be called a panorama. When four images of which clip positions are changeable are clipped from a fisheye image, it can be called a quad-view mode or a quad-clip mode. When two panoramic video images are clipped, it can be called a double-panorama mode. The distortion correction process in dewarping is a process of adjusting a distortion or inclination due to a fisheye lens and converting an image into a state substantially the same as a state that a person views the image.

In the embodiments, performing the above-described correction process is at least referred to as dewarping, and information on dewarping is referred to as dewarp information. In other words, information that indicates whether dewarping has been performed (or whether to perform dewarping), information (its name) that indicates what dewarping has been performed, and other information, are referred to as dewarp information. Dewarp information may be simply the name of each video stream related to a fisheye image (such as fisheye, clip, and panorama) or an index that indicates the name. Dewarp information may be information that indicates what video stream is to be sent or received based on a fisheye image at least between a surveillance camera and a client apparatus.

Figure 3A:
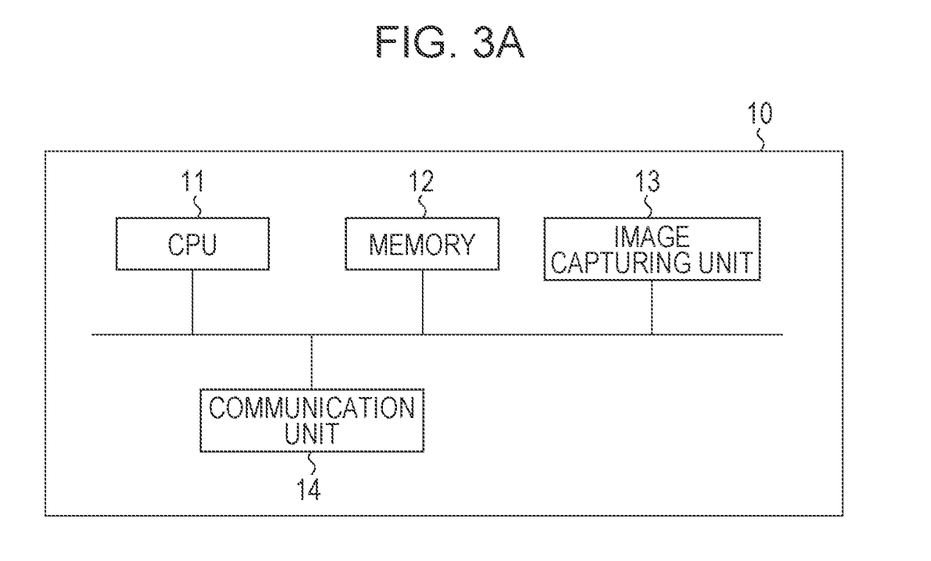
FIG. 3A is a diagram that illustrates an example of a hardware constitution.

FIG. 3A is a diagram that illustrates an example of the hardware constitution of the surveillance camera 10.

A CPU 11 controls the entire surveillance camera 10.

A memory 12 is used as a storage area for various data. The storage area includes a program storage area for a program that the CPU 11 runs, a work area during running of the program, and the like. In addition, the storage area includes a setting value storage area for setting values (configurations) of a surveillance camera, profiles, an association setting between each profile and dewarp information, an installation condition of the camera, such as ceiling mounting and wall mounting, and the like.

In addition, the storage area includes an information storage area for a dependency table among configurations, pan, tilt, and zoom support information of each dewarp information, and the like, a storage area for image data that an image capturing unit 13 (described later) generates, and the like. The configurations include, for example, a video source setting (video source configuration). The video source setting (video source configuration) contains dewarp information and a resolution. The dewarp information determines the presence or absence and type of image distortion correction and image clipping range. The resolution is that a sensor is able to output. The configurations include, for example, a video encoder setting (video encoder configuration) that contains an encode type for encoding an image, a resolution, and the like. The configurations include, for example, a PTZ setting (PTZ configuration) that contains, for example, whether pan, tilt, or zoom is supported or not. The configurations are mapped (associated) to a profile to be designated for control over a surveillance camera. The surveillance camera performs video distribution, PTZ control, or the like, with the details of the configurations mapped to the profile.

The image capturing unit 13 captures the image of a subject focused by an image capturing optical system of the surveillance camera 10, converts an acquired analog signal to digital data, and outputs the digital data to the memory 12 as a captured image. When a captured image is output to the memory 12, the CPU 11 receives an image acquisition event from the image capturing unit 13.

A communication unit 14 is used when a control command for, for example, acquiring a profile is received from an external apparatus or when a response to the control command is sent to the external apparatus. When a command has been received from an external apparatus, the CPU 11 receives a command receiving event from the communication unit 14.

The software constitution of FIG. 4A, the process that the surveillance camera 10 executes, illustrated in the sequence diagram of FIG. 5, and the processes of the flowcharts of FIG. 7 to FIG. 11, described later, are implemented by the CPU 11 executing processes based on a program stored in the memory 12.

The hardware constitution of the surveillance camera 10, illustrated in FIG. 3A, is one example, and, other than the one illustrated in FIG. 3A, the surveillance camera 10 may include a voice input unit, a voice output unit, an image analyzing unit, and the like, as hardware components.

Figure 3B:
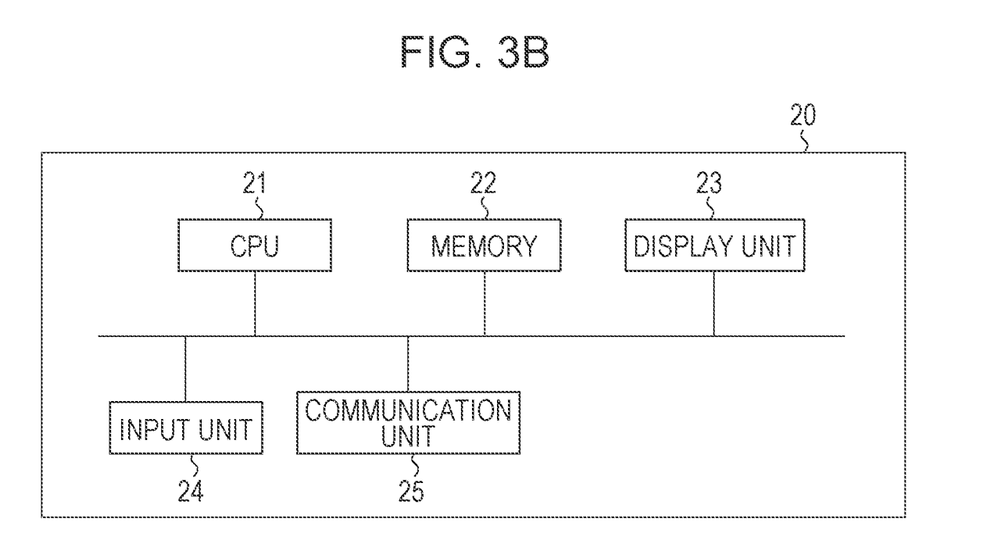
FIG. 3B is a diagram that illustrates an example of a hardware constitution.

FIG. 3B is a diagram that illustrates an example of the hardware constitution of the client apparatus 20.

A CPU 21 controls the entire client apparatus 20.

A memory 22 is used as a storage area for various data, such as a program storage area for a program that the CPU 21 mainly runs and a work area during running of the program.

A display unit 23 is, for example, an LCD, an organic EL display, or the like. The display unit 23 displays various setting screens and display screens including a setting screen to associate a profile with dewarp information, a viewer for video images that are received from the surveillance camera 10, various messages, and the like, for a user of the client apparatus 20.

An input unit 24 is, for example, a button, an arrow key, a touch panel, a mouse, or the like, and provides the details of screen operation by the user to the CPU 21.

A communication unit 25 is used, for example, when a control command, such as a profile association setting command and a profile acquisition command, is sent to the surveillance camera 10 or when a response to a control command or a video stream is received from the surveillance camera 10.

The software constitution of FIG. 4B and the process that the client apparatus 20 executes, illustrated in the sequence diagram of FIG. 5, described later, are implemented by the CPU 21 executing processes based on the program stored in the memory 22.

Figure 4A:
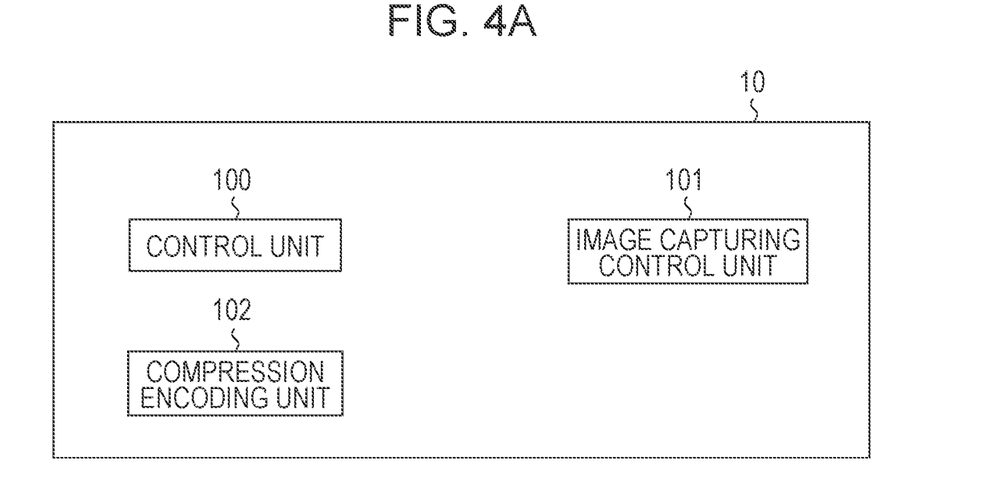
FIG. 4A is a diagram that illustrates an example of a software constitution.

FIG. 4A is a diagram that illustrates an example of the software constitution of the surveillance camera 10.

A control unit 100 controls the entire process of the surveillance camera 10.

An image capturing control unit 101 controls the image capturing unit 13. For example, the image capturing control unit 101 changes an image capturing range of the image capturing unit 13 by tilting, panning, or zooming the image capturing range in accordance with the value of pan, tilt, or zoom, input from the control unit 100.

A compression encoding unit 102 generates image data by performing compression encoding on a captured image output from the image capturing unit 13 based on the format of JPEG, H.264, H.265, or the like, and outputs the image data to the memory 12.

The image capturing control unit 101 may be implemented in the surveillance camera 10 as a hardware component. Similarly, the compression encoding unit 102 may be implemented in the surveillance camera 10 as a hardware component.

Figure 4B:
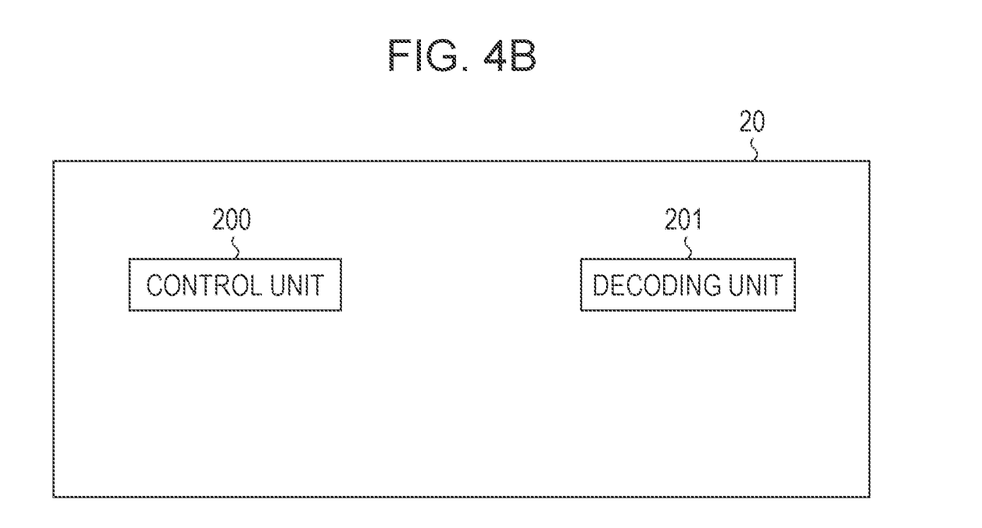
FIG. 4B is a diagram that illustrates an example of a software constitution.

FIG. 4B is a diagram that illustrates an example of the software constitution of the client apparatus 20.

A control unit 200 controls the entire process of the client apparatus 20.

A decoding unit 201 decodes the compression-encoded image data, received via the communication unit 25, based on the format of JPEG, H.264, H.265, or the like, and expands the image data in the memory 22.

The decoding unit 201 may be implemented in the client apparatus 20 as a hardware component.

Figure 5:
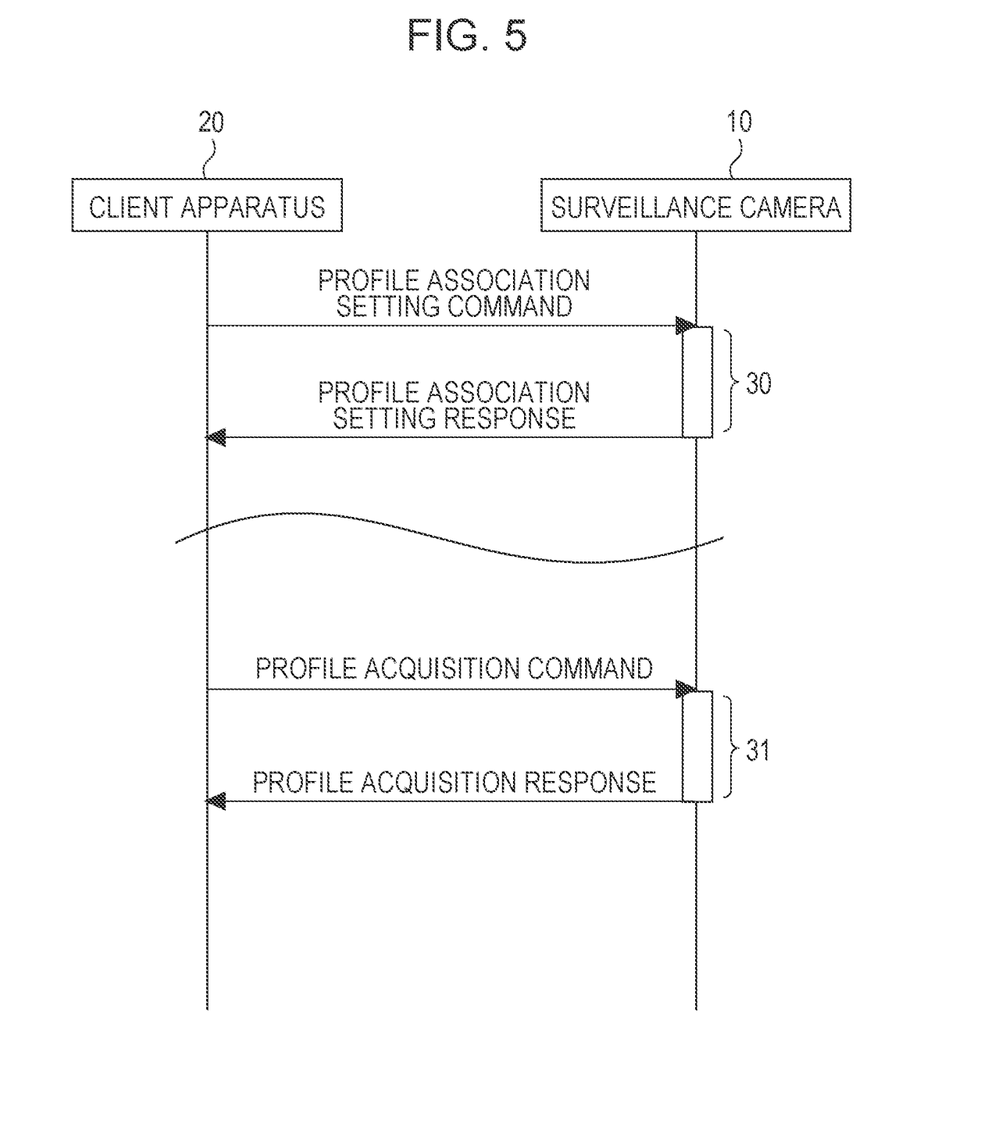
FIG. 5 is a sequence diagram that illustrates an example of an information process in a system.

FIG. 5 is a sequence diagram of a process related to a profile association setting command and a profile acquisition command for the surveillance camera 10.

The control unit 200 of the client apparatus 20 sends a profile association setting command that contains association information between a profile and dewarp information. The control unit 100 of the surveillance camera 10 receives the profile association setting command, executes a profile association setting command process 30, and sends a profile association setting response to the client apparatus 20 as a response to the command. The control unit 200 of the client apparatus 20 receives the profile association setting response. A profile is a setting information group containing a plurality of pieces of setting information, as illustrated in FIG. 1 and other drawings. Association information is an example of information that indicates a relationship between a profile and dewarp information.

The control unit 200 of the client apparatus 20 sends a profile acquisition command. The control unit 100 of the surveillance camera 10 receives the profile acquisition command, executes a profile acquisition command process 31, and sends a profile acquisition response to the client apparatus 20 as a response to the command. The control unit 200 of the client apparatus 20 receives the profile acquisition response.

In FIG. 5, a profile association setting command and a profile acquisition command are sent from the same client apparatus 20. Alternatively, these commands may be sent from different client apparatuses 20. A protocol of each command is not limited. A protocol of each command is, for example, a control protocol compliant with ONVIF or a control protocol specific for a surveillance camera.

The profile association setting command process 30 or the profile acquisition command process 31 is an example of an information process.

Figure 6:
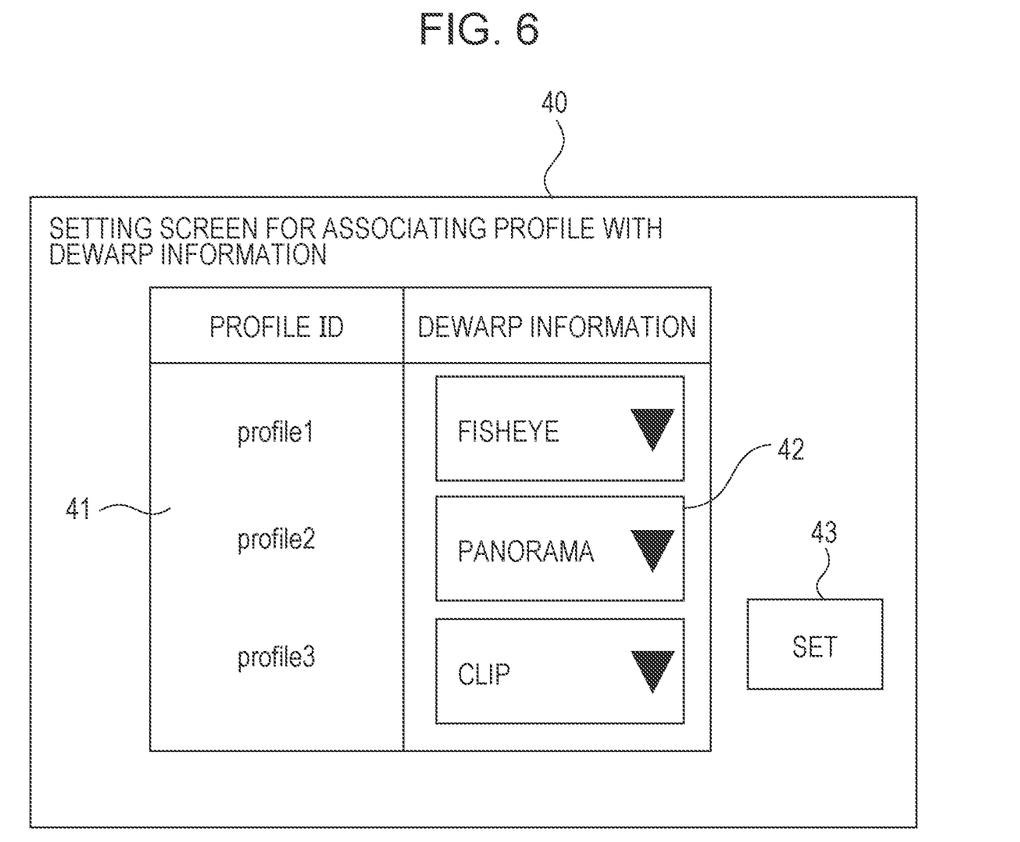
FIG. 6 is a view that illustrates an example of a setting screen.

FIG. 6 is a setting screen for associating a profile with dewarp information. The setting screen of FIG. 6 is displayed on the display unit 23 of the client apparatus 20. A list of identifier IDs of profiles that are set in the surveillance camera 10 is displayed in a profile ID list area 41. A user operates the input unit 24 of the client apparatus 20, and selects dewarp information to be associated with a profile from a dewarp information select box 42. As the user selects an association setting 43, the control unit 200 of the client apparatus 20 sends a profile association setting command to the surveillance camera 10.

Data for displaying the setting screen of FIG. 6 may be prepared in the client apparatus 20 or may be prepared in the surveillance camera 10, and may be displayed on a web browser, or the like, of the client apparatus 20 in response to a request from the client apparatus 20.

Figure 7:
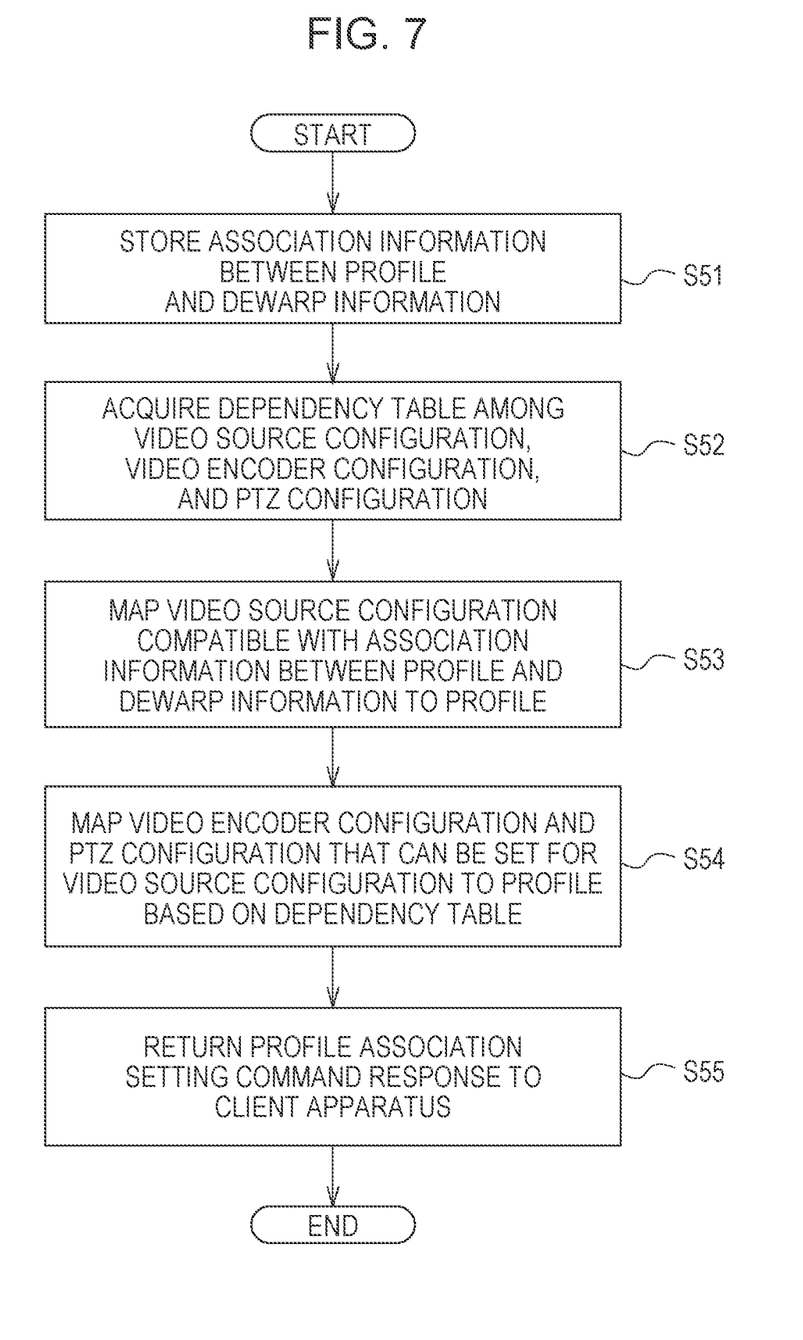
FIG. 7 is a flowchart that illustrates an example of a profile association setting command process.

FIG. 7 is a flowchart that illustrates an example of the profile association setting command process 30.

In S51, the control unit 100 stores, in the memory 12, profile association information (association information between a profile and dewarp information) designated by the profile association setting command, and proceeds to S52.

In S52, the control unit 100 acquires a dependency table 60 among a video source configuration, a video encoder configuration, and a PTZ configuration, from the memory 12, and proceeds to S53.

Figure 8:
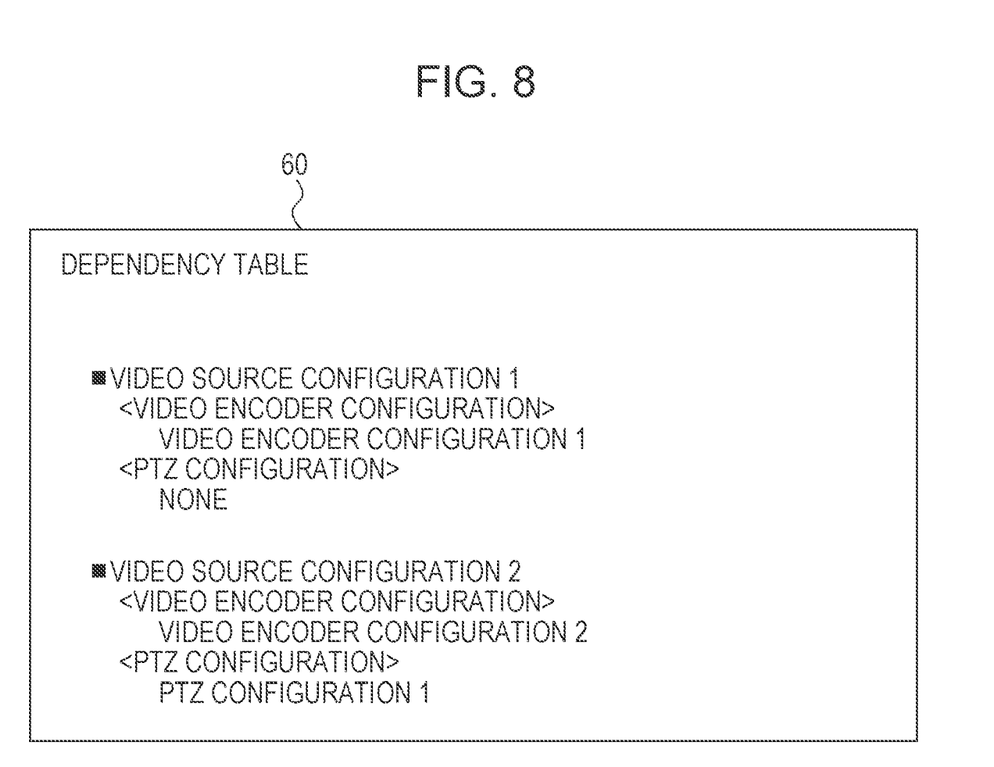
FIG. 8 is a view that illustrates an example of a dependency table.

FIG. 8 is a view that illustrates an example of the dependency table among configurations that can be mapped to a profile. The video encoder configuration that can be mapped to a profile together with video source configuration 1 is video encoder configuration 1, and there is no PTZ configuration. The video encoder configuration that can be mapped to a profile together with video source configuration 2 is video encoder configuration 2, and the PTZ configuration is PTZ configuration 1.

In S53, the control unit 100 acquires the association information between a profile and dewarp information from the memory 12, maps a video source configuration compatible with the association information to the profile, and proceeds to S54. The process of S53 is an example of a process of acquiring association information between a profile and dewarp information.

In S54, the control unit 100 maps a video encoder configuration and a PTZ configuration compatible with the mapped video source configuration to a profile with the details of the dependency table. The processes of S53 and S54 are an example of a mapping process of mapping a video source configuration, a video encoder configuration, and a PTZ configuration to a profile based on association information. The process of S54 is an example of a process of mapping a video encoder configuration and a PTZ configuration that both can be set to the mapped video source configuration to a profile based on the dependency table.

In S55, the control unit 100 generates a response to the profile association setting command and sends the profile association setting command response to the client apparatus 20.

Figure 9:
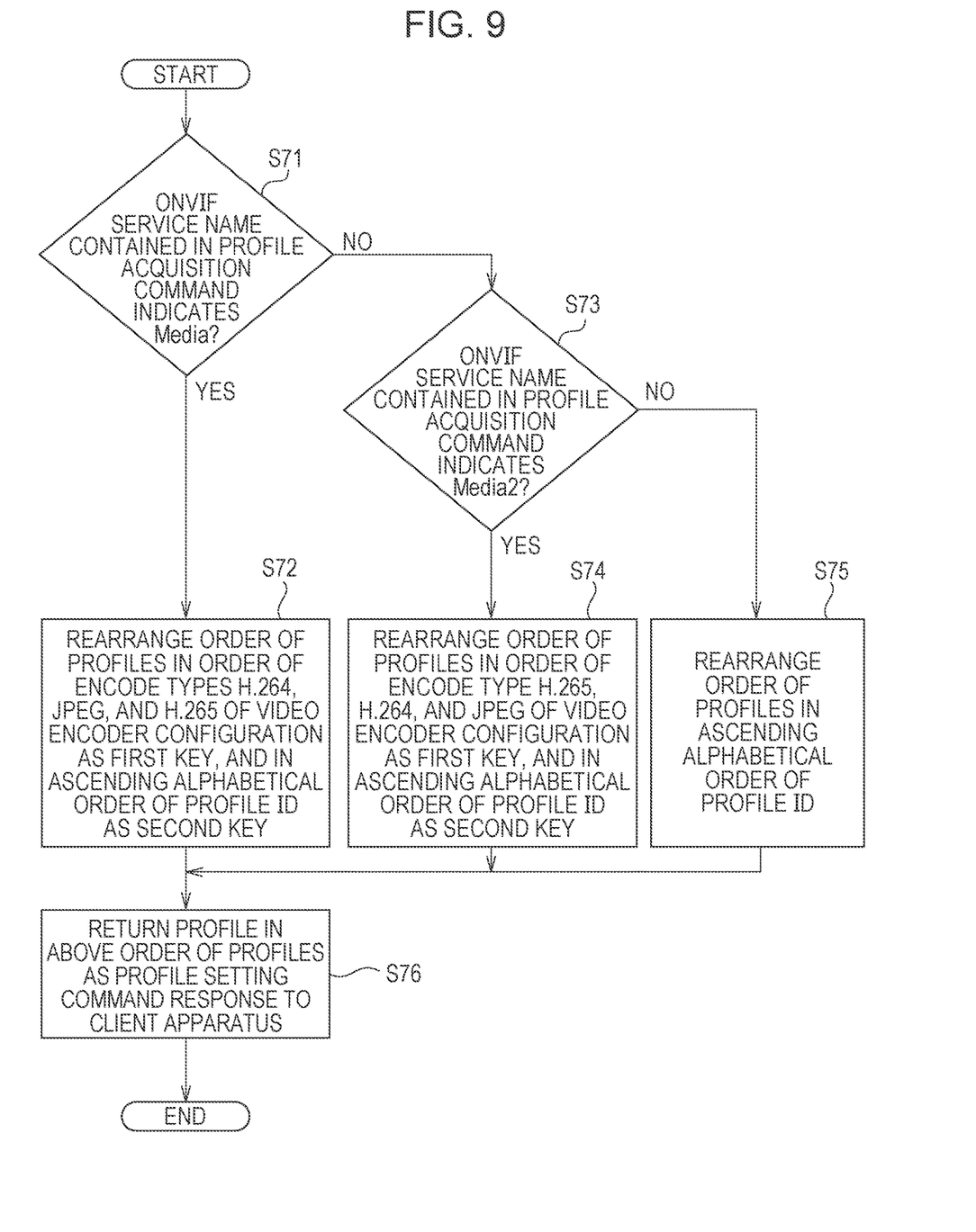
FIG. 9 is a flowchart that illustrates an example of a profile acquisition command process.

FIG. 9 is a flowchart that illustrates an example of the profile acquisition command process 31.

In S71, the control unit 100 acquires an ONVIF service name contained in a profile acquisition command and determines whether the ONVIF service name indicates Media service that supports JPEG and H.264 as video encoding. When the ONVIF service name indicates Media service that supports JPEG and H.264 as video encoding, the control unit 100 proceeds to S72; otherwise, the control unit 100 proceeds to S73.

In S72, the control unit 100 rearranges the order of profiles to be returned as a response to the profile acquisition command. First, the control unit 100 rearranges profiles in order of H.264, JPEG, and H.265, in which the encode type of the video encoder configuration contained in the profile is arranged. The control unit 100 further rearranges the profiles of the same encode type in ascending alphabetical order of profile ID, and proceeds to S76.

In S73, the control unit 100 acquires the ONVIF service name contained in the profile acquisition command, and determines whether the ONVIF service name indicates Media2 service that supports JPEG, H.264, and H.265 as video encoding. When the ONVIF service name indicates Media2 service that supports JPEG, H.264, and H.265 as video encoding, the control unit 100 proceeds to S74; otherwise, the control unit 100 proceeds to S75.

In S74, the control unit 100 rearranges the order of profiles to be returned as a response to the profile acquisition command. First, the control unit 100 rearranges profiles in order of H.265, H.264, and JPEG, in which the encode type of the video encoder configuration contained in the profile is arranged. After that, the control unit 100 further rearranges the profiles of the same encode type in ascending alphabetical order of profile ID, and proceeds to S76.

In S75, the control unit 100 rearranges the order of profiles to be returned as a response to the profile acquisition command. The control unit 100 rearranges the profiles in ascending alphabetical order of profile ID, and proceeds to S76.

In S76, the control unit 100 generates a response to the profile acquisition command with the rearranged profiles, and sends the profile acquisition command response to the client apparatus 20.

FIG. 9 illustrates an example of control for determining the order of profiles for response in accordance with a service name contained in a profile acquisition command. Instead of a service name, control for determining the order of profiles for response may be executed in accordance with version information.

The process of FIG. 9 is an example of a process of executing control such that, in accordance with a service name contained in a profile acquisition command, a profile containing a video encoder configuration in which an unsupported encode type is set is sent to the client apparatus 20 last.

As described above, in the first embodiment, a user does not need to consider the dependency among a video source configuration, a video encoder configuration, and a PTZ configuration. The surveillance camera 10 is able to map a video source configuration, a video encoder configuration, and a PTZ configuration compatible with dewarp information associated with a profile by a user to the profile based on the dependency table among the configurations. Therefore, appropriate video image distribution and PTZ control can be performed.

A profile to be returned in response to a profile acquisition command can be preferentially returned as a profile that the client apparatus 20 can handle.

Second Embodiment

Figure 10:
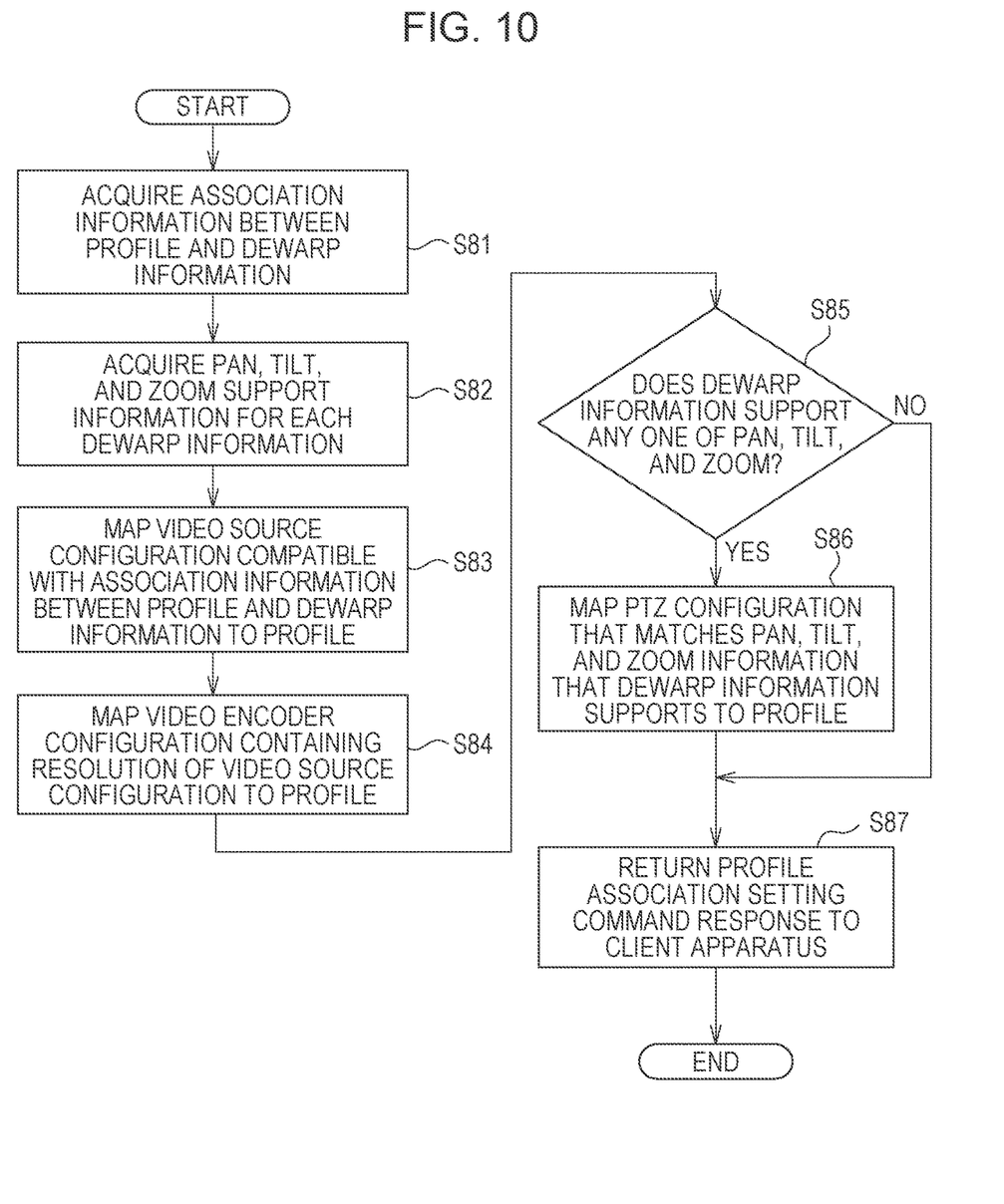
FIG. 10 is a flowchart that illustrates an example of a profile association setting command process.

Hereinafter, the profile association setting command process 30 at the time when the surveillance camera 10 receives a profile association setting command according to a second embodiment will be described with reference to FIG. 10. The description of the same portions as those of the first embodiment is omitted.

In S81, the control unit 100 stores, in the memory 12, profile association information designated in the profile association setting command, and proceeds to S82.

In S82, the control unit 100 acquires pan, tilt, and zoom support information indicating that pan, tilt, or zoom is allowed for each dewarp information from the memory 12, and proceeds to S83.

In S83, the control unit 100 maps a video source configuration compatible with the association information to a profile, and proceeds to S84.

In S84, the control unit 100 maps a video encoder configuration having a resolution that a sensor is able to output in the video source configuration to a profile, and proceeds to S85.

In S85, the control unit 100 determines whether dewarp information supports any one of pan, tilt, and zoom based on the pan, tilt, and zoom support information. When the dewarp information supports any one of pan, tilt, and zoom, the control unit 100 proceeds to S86; whereas, when the dewarp information does not support any one of pan, tilt, and zoom, the control unit 100 proceeds to S87.

In S86, the control unit 100 maps the PTZ configuration that matches the pan, tilt, and zoom support information to a profile, and proceeds to S87.

In S87, the control unit 100 generates a response to the profile association setting command and sends the profile association setting command response to the client apparatus 20.

As described above, in the second embodiment, a user does not need to consider the dependency among a video source configuration, a video encoder configuration, and a PTZ configuration. The surveillance camera 10 is able to map a compatible video source configuration, video encoder configuration, and PTZ configuration based on the resolutions of the video source configuration and video encoder configuration and the pan, tilt, and zoom support information to a profile. Therefore, appropriate video image distribution and PTZ control can be performed.

A profile to be returned in response to a profile acquisition command can be preferentially returned as a profile that the client apparatus 20 can handle.

Third Embodiment

Figure 11:
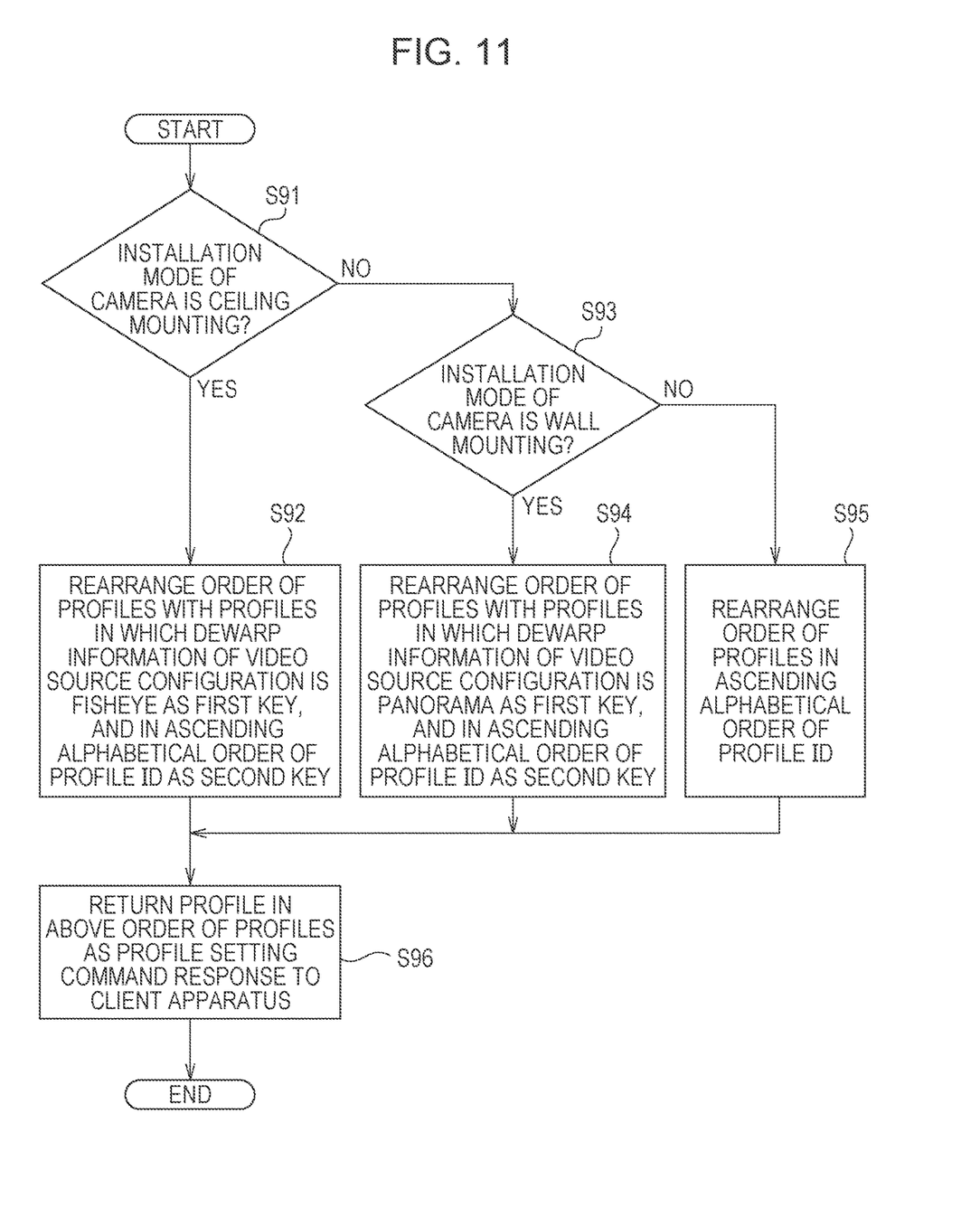
FIG. 11 is a flowchart that illustrates an example of a profile acquisition command process.

Hereinafter, the profile acquisition command process 31 at the time when the surveillance camera 10 receives a profile acquisition command according to a third embodiment will be described with reference to FIG. 11. The description of the same portions as those of the first embodiment is omitted.

In S91, the control unit 100 acquires an installation mode of a camera from the memory 12 and determines whether the installation mode is ceiling mounting. When the installation mode is ceiling mounting, the control unit 100 proceeds to S92; otherwise, the control unit 100 proceeds to S93.

In S92, the control unit 100 rearranges the order of profiles to be returned as a response to the profile acquisition command. First, the control unit 100 rearranges profiles in order of a fisheye (no dewarping), clip 1 (with dewarping and a clip position is two-dimensionally changeable), and a panorama (with dewarping and a clip position is two-dimensionally unchangeable), in which dewarp information of a video source configuration contained in the profile is arranged, then further rearranges the profiles of the same dewarp information in ascending alphabetical order of profile ID, and proceeds to S96.

In S93, the control unit 100 acquires the installation mode of the camera from the memory 12 and determines whether the installation mode is wall mounting. When the installation mode is wall mounting, the control unit 100 proceeds to S94; otherwise, the control unit 100 proceeds to S95.

In S94, the control unit 100 rearranges the order of profiles to be returned as a response to the profile acquisition command. First, the control unit 100 rearranges profiles in order of panorama, clip 1, and fisheye, in which the dewarp information of the video source configuration contained in the profile is arranged, then further rearranges the profiles of the same dewarp information in ascending alphabetical order of profile ID, and proceeds to S96.

In S95, the control unit 100 rearranges the order of profiles to be returned as a response to the profile acquisition command. The control unit 100 rearranges the profiles in ascending alphabetical order of profile ID, and proceeds to S96.

In S96, the control unit 100 generates a response to the profile acquisition command with the rearranged profiles, and sends the profile acquisition command response to the client apparatus 20.

As described above, in the third embodiment, a user does not need to consider the dependency among a video source configuration, a video encoder configuration, and a PTZ configuration. The surveillance camera 10 is able to map a video source configuration, a video encoder configuration, and a PTZ configuration compatible with dewarp information associated with a profile by a user to the profile based on the dependency table among the configurations. Therefore, appropriate video image distribution and PTZ control can be performed.

A profile to be returned in response to a profile acquisition command can be preferentially returned as a profile that is assumed to be used in the installation mode of a surveillance camera, such as ceiling mounting and wall mounting.

Other Embodiments

Embodiments of the present invention can be implemented by the following process. A program that implements one or more functions of the above-described embodiments is supplied to a system or apparatus via a network or a storage medium. Embodiments of the present invention may be implemented by a process in which one or more processors in a computer of the system or apparatus read and run the program. Alternatively, embodiments of the present invention may be implemented by a circuit (for example, ASIC) that implements one or more functions.

An example of embodiments of the present invention is described in detail; however, embodiments of the present invention are not limited to such specific embodiments.

The hardware constitution of the above-described surveillance camera 10 is one example, and, for example, a plurality of CPUs, a plurality of memories, a plurality of communication units, or the like, may be included. A plurality of CPUs may be configured to execute a process while using data, and the like, stored in a plurality of memories based on a program. Instead of a CPU, a graphics processing unit (GPU) may be used.

The above-described embodiments may be implemented in any combination.

According to the above-described embodiments, the dependency of combinations of configurations can be solved.

Embodiments of the present invention are not limited to the above-described embodiments. Various changes or modifications are applicable without departing from the spirit and scope of the present invention. Therefore, the following claims are attached to show the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image capturing apparatus that is configured to send an image to an external apparatus in an image type that is any one of a plurality of image types, the image capturing apparatus comprising a computer to execute instructions that, when executed by the computer, cause the computer to function as:
    an associating unit configured to associate a video source configuration, a video encoder configuration, and a PTZ configuration with a profile on an image to be sent to the external apparatus;
    a storage unit configured to store association information that indicates a relationship between at least any one of a video source configuration, a video encoder configuration, and a PTZ configuration and the image type;
    an acquiring unit configured to acquire, from the external apparatus, information on the image type to be associated with the profile;
    a determining unit configured to, based on the information on the image type, acquired by the acquiring unit, and the association information stored in the storage unit, determine a video source configuration, a video encoder configuration, and a PTZ configuration to be associated by the associating unit with the profile; and
    a control unit configured to, in a case where a plurality of profiles is sent to the external apparatus based on a profile acquisition command received from the external apparatus, execute control such that a profile containing a video encoder configuration in which an unsupported encode type is set is sent to the external apparatus last in accordance with a service name contained in the profile acquisition command.

2. The image capturing apparatus according to claim 1, wherein
    the determining unit is configured to determine to associate the video source configuration compatible with the image type with a profile based on the association information, and
    the determining unit is configured to determine to associate a video encoder configuration and a PTZ configuration that are both settable to the video source configuration associated with the profile by consulting a dependency table among a video source configuration, a video encoder configuration, and a PTZ configuration.

3. The image capturing apparatus according to claim 1, wherein
the determining unit is configured to determine to associate the video source configuration compatible with the image type with a profile based on the association information,
the determining unit is configured to determine to associate a video encoder configuration containing a resolution of the video source configuration with the profile, and
the determining unit is configured to determine to associate a PTZ configuration that matches pan, tilt, and zoom that the image type supports, with the profile.

4. A non-transitory storage medium storing a program for causing a computer to function as the units of the image capturing apparatus according to claim 1.

5. The image capturing apparatus according to claim 1, wherein the image capturing apparatus includes a fisheye lens and sends the image obtained by performing capturing with the fisheye lens to the external apparatus, and
wherein the plurality of image types includes an image type in which an image is not dewarped and a plurality of image types that are view types in which an image is dewarped and that are different in mode of dewarping.

6. The image capturing apparatus according to claim 5, wherein the instructions further cause the computer to function as a control unit configured to, when a plurality of profiles is sent based on a profile acquisition command received from an external apparatus, determine an order of the profiles for response in accordance with an installation mode of the image capturing apparatus.

7. The image capturing apparatus according to claim 5, wherein the image type in which an image is not dewarped is an image type in which an image is obtained by performing capturing with the fisheye lens and is not subjected to a correction process.

8. The image capturing apparatus according to claim 5, wherein images of the plurality of image types that are different in mode of dewarping include a clipped image partially clipped from the image.

9. The image capturing apparatus according to claim 8, wherein the clipped image includes a panoramic image.

10. A control method for an image capturing apparatus including a storage unit, the image capturing apparatus being capable of sending an image to an external apparatus in an image type that is any one of a plurality of image types, the storage unit being configured to store association information that indicates a relationship between at least any one of a video source configuration, a video encoder configuration, and a PTZ configuration and the image type, the control method using a computer executing instructions that, when executed by the computer, cause the computer to execute the control method, the control method comprising:
an associating step of associating a video source configuration, a video encoder configuration, and a PTZ configuration with a profile on an image to be sent to the external apparatus;
an acquiring step of acquiring, from the external apparatus, information on the image type to be associated with the profile;
a determining step of, based on the information on the image type, acquired in the acquiring step, and the association information stored in the storage unit, determining a video source configuration, a video encoder configuration, and a PTZ configuration to be associated in the associating step with the profile; and
a controlling step of, in a case where a plurality of profiles is sent to the external apparatus based on a profile acquisition command received from the external apparatus, executing control such that a profile containing a video encoder configuration in which an unsupported encode type is set is sent to the external apparatus last in accordance with a service name contained in the profile acquisition command.

* * * * *